US008085679B2

(12) United States Patent
Lee

(10) Patent No.: US 8,085,679 B2
(45) Date of Patent: Dec. 27, 2011

(54) APPARATUSES AND METHODS FOR CONTROLLING BIT RATES IN VARIABLE BIT RATE VIDEO CODING

(75) Inventor: Jung-woo Lee, Seongnam-si (KR)

(73) Assignees: Samsung Electronics Co., Ltd., Gyeonggi-do (KR); Seoul National University Industry Foundation, Seoul (KR)

( * ) Notice: Subject to any disclaimer, the term of this patent is extended or adjusted under 35 U.S.C. 154(b) by 1316 days.

(21) Appl. No.: 11/723,492

(22) Filed: Mar. 20, 2007

(65) Prior Publication Data

US 2007/0237223 A1    Oct. 11, 2007

(30) Foreign Application Priority Data

Mar. 25, 2006  (KR) .................. 10-2006-0027206

(51) Int. Cl.
*H04L 1/00* (2006.01)
(52) U.S. Cl. ............... 370/252; 370/395.64; 370/395.65
(58) Field of Classification Search .................. None
See application file for complete search history.

(56) References Cited

U.S. PATENT DOCUMENTS

| | | | | |
|---|---|---|---|---|
| 5,559,722 A * | 9/1996 | Nickerson | ....................... | 341/50 |
| 5,592,226 A * | 1/1997 | Lee et al. | ................. | 375/240.14 |
| 6,160,846 A * | 12/2000 | Chiang et al. | ............. | 375/240.05 |
| 6,765,962 B1 * | 7/2004 | Lee et al. | ................. | 375/240.03 |
| 6,879,632 B1 * | 4/2005 | Yokoyama | ............... | 375/240.13 |
| 6,937,770 B1 * | 8/2005 | Oguz et al. | .................... | 382/235 |
| 2002/0136295 A1 | 9/2002 | Sato | | |
| 2002/0168007 A1 * | 11/2002 | Lee | ........................... | 375/240.03 |
| 2004/0008899 A1 | 1/2004 | Tourapis et al. | | |
| 2005/0089092 A1 * | 4/2005 | Hashimoto et al. | ....... | 375/240.03 |
| 2006/0062292 A1 * | 3/2006 | Boice et al. | .............. | 375/240.01 |

FOREIGN PATENT DOCUMENTS

| | | |
|---|---|---|
| JP | 2000-197049 | 7/2000 |
| JP | 2001-238215 | 8/2001 |
| KR | 10-2004-0004178 A | 1/2004 |
| KR | 10-2005-0018047 | 2/2005 |

OTHER PUBLICATIONS

Office Action dated Jan. 8, 2010, issued in corresponding Chinese Application No. 200701379551 and English translation thereof.
Korean Patent Office Action dated Jul. 27, 2007, corresponding to counterpart foreign application 10-2006-0027206.

* cited by examiner

*Primary Examiner* — Anthony Sol
(74) *Attorney, Agent, or Firm* — Harness, Dickey & Pierce, P.L.C.

(57) ABSTRACT

A bit rate control method may include calculating a quality measure of a current frame and a mean of quality measures of two or more previous frames in order to calculate a deviation of the quality measure of the current frame from the mean of the quality measures of the two or more previous frames; comparing the deviation to a critical value measure; and controlling a quantization parameter in response to a result of the comparison. A bit rate control apparatus may include a quality measure calculator that calculates the quality measure of the current frame and the mean of the quality measures of the two or more previous frames in order to calculate the deviation; a comparator that compares the deviation to the critical value measure; and a quantization parameter setting unit that controls the quantization parameter in response to the result of the comparison.

20 Claims, 4 Drawing Sheets

APPARATUSES AND METHODS FOR CONTROLLING BIT RATES IN VARIABLE BIT RATE VIDEO CODING

PRIORITY STATEMENT

This application claims priority from Korean Patent Application No. 10-2006-0027206, filed on Mar. 25, 2006, in the Korean Intellectual Property Office (KIPO), the entire contents of which are incorporated herein by reference.

BACKGROUND

1. Field

Example embodiments relate to variable bit rate video coding. Also, example embodiments relate to methods and apparatuses for controlling bit rates in variable bit rate video coding by setting a quantization parameter of each frame using a measure calculated for each frame.

2. Description of Related Art

Generally, video compressing (or coding) techniques use constant bit rate (CBR) coding methods or variable bit rate (VBR) coding methods. The constant bit rate coding method encodes a video signal, such as a broadcast signal, into a predetermined number of bits for a predetermined period of time. The constant bit rate coding method allocates the same number of bits to both a still image and a moving image. Thus, the quality of the moving image is poor in the constant bit rate coding method because the moving image requires a larger number of bits allocated thereto.

The variable bit rate coding method allocates bits to a video signal in response to the characteristic of the video signal (for example, in response to whether the video signal corresponds to a still image or a moving image) when there is a sufficient bandwidth or when a storage medium such as a digital video disk (DVD) is used. The variable bit rate coding method may allocate a larger number of bits to a moving image so that it can improve the quality of the moving image as compared to the constant bit rate coding method. Accordingly, the variable bit rate coding method is used for Moving Picture Experts Group (MPEG)-4 and H.264, which are applied to next-generation DVD recorders, as well as for MPEG-2, which is applied to currently used DVD recorders.

The variable bit rate coding method allocates bits to a video signal in response to the characteristic of the video signal (that is, it varies the bit rate) and, thus, it is important to control the bit rate. A representative method of controlling the bit rate is the TM5 algorithm used in MPEG-2. Different bit rates have to be allocated to an intra-coded picture frame (I-frame), a predictive-coded picture frame (P-frame), and a bidirectionally predictive-coded picture frame (B-frame) based on picture type in order to control the bit rate. However, a fixed bit rate is allocated to the I-, P-, and B-frames, and thus picture quality of the I-, P-, and B-frames may deteriorate. Accordingly, it is necessary to control the allocation of bits to the I-, P-, and B-frames in response to the type of input image in order to minimize variation in the picture quality based upon the type of image frame.

SUMMARY

Example embodiments provide methods of controlling bit rates in variable bit rate video encoding by setting a quantization parameter of each frame using a measure calculated for each frame.

Example embodiments also provide an apparatus for controlling bit rates in variable bit rate video encoding by setting a quantization parameter of each frame using a measure calculated for each frame.

According to example embodiments, bit rate control methods may include calculating a quality measure of a current frame and a mean of quality measures of two or more previous frames in order to calculate a deviation of the quality measure of the current frame from the mean of the quality measures of the two or more previous frames; comparing the deviation to a critical value measure (that may or may not be predetermined); and/or controlling a quantization parameter in response to a result of the comparison.

The controlling of the quantization parameter may include resetting the quantization parameter when the absolute value of the deviation is greater than the critical value measure, and/or maintaining the quantization parameter when the absolute value of the deviation is less than or equal to the critical value measure. Also, the controlling of the quantization parameter may include resetting the quantization parameter when the absolute value of the deviation is greater than or equal to the critical value measure, and/or maintaining the quantization parameter when the absolute value of the deviation is less than the critical value measure.

The quality measure may be, for example, a picture quality measure. In at least this case, the resetting of the quantization parameter may include resetting the quantization parameter to increase a quantization scale when the deviation is greater than (or greater than or equal to) the critical value measure, and/or resetting the quantization parameter to decrease the quantization scale when the deviation is less than (or less than or equal to) the negative of the critical value measure.

The quality measure may be, for example, a distortion measure. In at least this case, the resetting of the quantization parameter may include resetting the quantization parameter to decrease the quantization scale when the deviation is greater than (or greater than or equal to) the critical value measure, and/or resetting the quantization parameter to increase the quantization scale when the deviation is less than (or less than or equal to) the negative of the critical value measure.

According to other example embodiments, bit rate control apparatuses may include a quality measure calculator, a comparator, and/or a quantization parameter setting unit. The quality measure calculator may calculate a quality measure of a current frame and a mean of quality measures of two or more previous frames in order to calculate a deviation of the quality measure of the current frame from the mean of the quality measures of the two or more previous frames. The comparator may compare the deviation to a critical value measure (that may or may not be predetermined). The quantization parameter setting unit may control a quantization parameter in response to a result of the comparison.

The quantization parameter setting unit may reset the quantization parameter when the absolute value of the deviation is greater than the critical value measure, and/or may maintain the quantization parameter when the absolute value of the deviation is less than or equal to the critical value measure. Also, the quantization parameter setting unit may reset the quantization parameter when the absolute value of the deviation is greater than or equal to the critical value measure, and/or may maintain the quantization parameter when the absolute value of the deviation is less than the critical value measure.

The quality measure may be, for example, a picture quality measure. In at least this case, the quantization parameter setting unit may reset the quantization parameter to increase a quantization scale when the deviation is greater than (or greater than or equal to) the critical value measure, and/or may reset the quantization parameter to decrease the quantization scale when the deviation is less than (or less than or equal to) the negative of the critical value measure.

The quality measure may be, for example, a distortion measure. In at least this case, the quantization parameter setting unit may reset the quantization parameter to decrease the quantization scale when the deviation is greater than (or greater than or equal to) the critical value measure, and/or may reset the quantization parameter to increase the quantization scale when the deviation is less than (or less than or equal to) the negative of the critical value measure.

BRIEF DESCRIPTION OF THE DRAWINGS

The above and/or other aspects and advantages will become more apparent and more readily appreciated from the following detailed description of example embodiments taken in conjunction with the accompanying drawings, in which.

DETAILED DESCRIPTION OF EXAMPLE EMBODIMENTS

Figure 1:
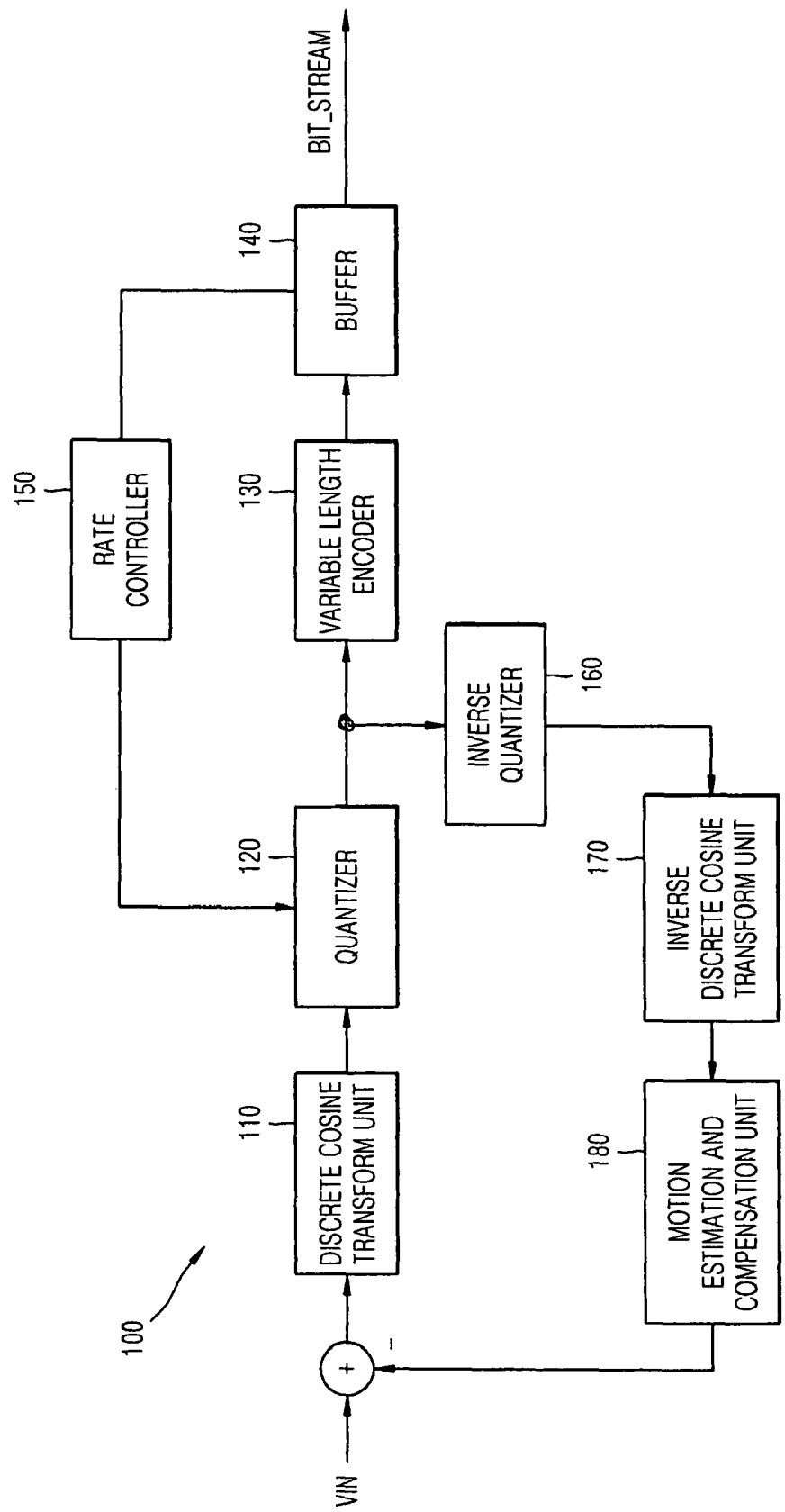
FIG. 1 is a block diagram of a conventional video encoding apparatus using a variable bit rate.

Example embodiments will now be described more fully with reference to the accompanying drawings. Embodiments, however, may be embodied in many different forms and should not be construed as being limited to the example embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," or "coupled to" to another component, it may be directly on, connected to, or coupled to the other component or intervening components may be present. In contrast, when a component is referred to as being "directly on," "directly connected to," or "directly coupled to" another component, there are no intervening components present. As used herein, the term "and/or" includes any and all combinations of one or more of the associated listed items.

It will be understood that, although the terms first, second, third, etc., may be used herein to describe various elements, components, regions, layers, and/or sections, these elements, components, regions, layers, and/or sections should not be limited by these terms. These terms are only used to distinguish one element component, region, layer, and/or section from another element, component, region, layer, and/or section. For example, a first element, component, region, layer, and/or section could be termed a second element, component, region, layer, and/or section without departing from the teachings of the example embodiments.

Spatially relative terms, such as "beneath," "below," "lower," "above," "upper," and the like may be used herein for ease of description to describe one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by one of ordinary skill in the art to which example embodiments belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

While an example of variable bit rate video encoding according to MPEG standards will be explained, those of ordinary skill in the art will understand that the example embodiments may be applied to any case(s) using a variable bit rate.

FIG. 1 is a block diagram of a conventional video encoding apparatus 100 using a variable bit rate. The video encoding apparatus 100 includes a discrete cosine transform unit 110, a quantizer 120, a variable length encoder 130, a buffer 140, a rate controller 150, an inverse quantizer 160, an inverse discrete cosine transform unit 170, and a motion estimation and compensation unit 180.

The video encoding apparatus 100 uses motion estimation and compensation. And the motion estimation and compensation are performed in response to frame type (I-, P-, or B-frame). This will be explained in detail with reference to FIG. 1.

The discrete cosine transform unit 110 converts input video signal VIN into a discrete cosine transform (DCT) about the I-frame. The discrete cosine transform unit 110 converts a difference between the output signal of the motion estimation and compensation unit 180 and the input video signal VIN into a DCT about a P-frame or B-frame.

The quantizer 120 quantizes a DCT coefficient output from the discrete cosine transform unit 110 in response to a quantization scale Q controlled by the rate controller 150. The variable length encoder 130 variable-length-encodes the quantized DCT coefficient. The buffer 140 stores the variable-length-encoded data and outputs it as a bit stream BIT_STREAM. The quantization scale Q is controlled by the rate controller 150 in response to buffer "fullness" that represents the degree to which the buffer 140 is filled with data. The quantization scale Q may be calculated, for example, as follows.

$$Q = 31\frac{d_j}{r}K_i$$

Here, r=2×(bit rate/frame rate), $K_i$ denotes a quantization parameter, and i represents I, P, or B. In addition, $d_j$ denotes buffer fullness that may be calculated, for example, as follows.

$$d_j = d_0 + B_{j-1} - \frac{(j-1)}{N_{mb}}T$$

Here, $d_0$ denotes an initial buffer content, $B_{j-1}$ denotes the number of bits actually generated from the first macroblock to the $(j-1)^{th}$ macroblock, $N_{mb}$ denotes the number of macroblocks per frame, and T denotes a target bit allocation of the current frame.

As described above, the rate controller 150 controls the quantization scale Q in response to the buffer fullness and the target bit allocation, but it cannot adjust a bit rate in response to a frame type. Furthermore, variable bit rate video encoding may not have a frame bit allocation process. Accordingly, example embodiments may use methods of directly changing the quantization scale instead of a method of controlling bit allocation for each frame in variable bit rate video encoding.

Moreover, example embodiments may prevent picture quality from varying according to frame type by controlling a bit rate using, for example, a method including: after each frame is encoded, calculating a quality measure of the frame and/or a mean of quality measures of two or more previous frames; calculating a deviation of the quality measure from the mean of the quality measures; comparing the deviation to a critical value measure; and/or controlling a quantization parameter in response to a result of the comparison.

Here, the quality measure may be, for example, a picture quality measure that may be obtained using peak signal-to-noise ratio (PSNT) of a frame and/or a distortion measure that may be obtained using mean square error (MSE).

Figure 2:
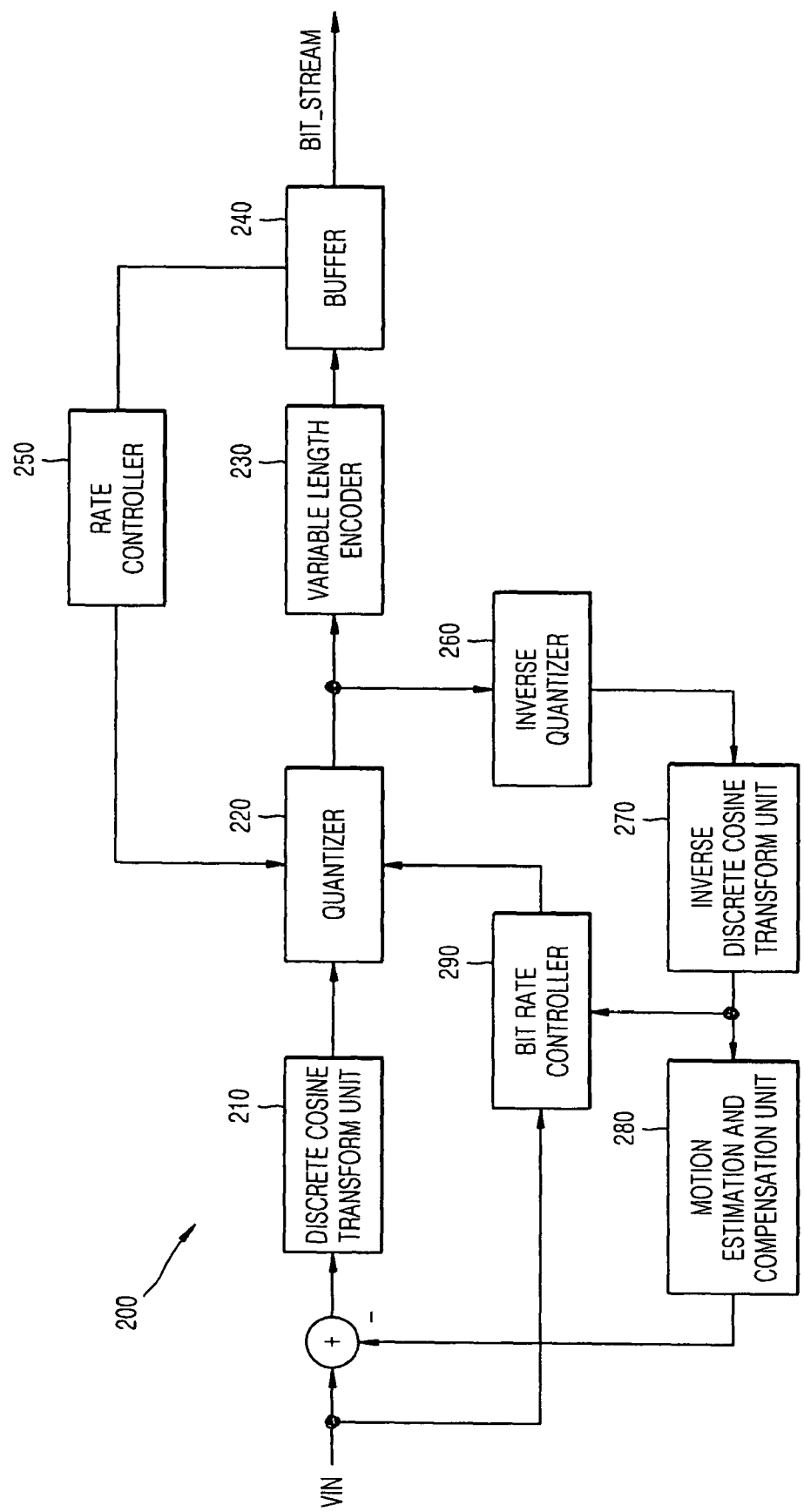
FIG. 2 is a block diagram of a video encoding apparatus including a bit rate controller according to an example embodiment.

FIG. 2 is a block diagram of a video encoding apparatus 200 including a bit rate controller 290 according to an example embodiment. The variable bit rate video encoding apparatus 200, compared to the video encoding apparatus 100 illustrated in FIG. 1, may include the bit rate controller 290, as well as discrete cosine transform unit 210, quantizer 220, variable length encoder 230, buffer 240, rate controller 250, inverse quantizer 260, inverse discrete cosine transform unit 270, and/or motion estimation and compensation unit 280.

The bit rate controller 290 may control a quantization parameter in response to a deviation of the quality measure of the current frame from a mean of the quality measures of two or more previous frames. Accordingly, a quantization scale used in the quantizer 220 may be controlled, for example, by the output signal of the bit rate controller 290 as well as by the output signal of the rate controller 250.

Figure 3:
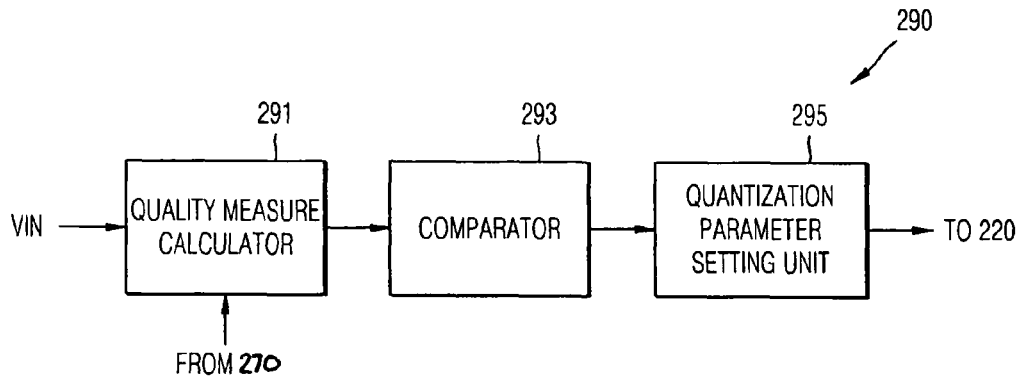
FIG. 3 is a block diagram of a bit rate controller according to an example embodiment.
Figure 4:
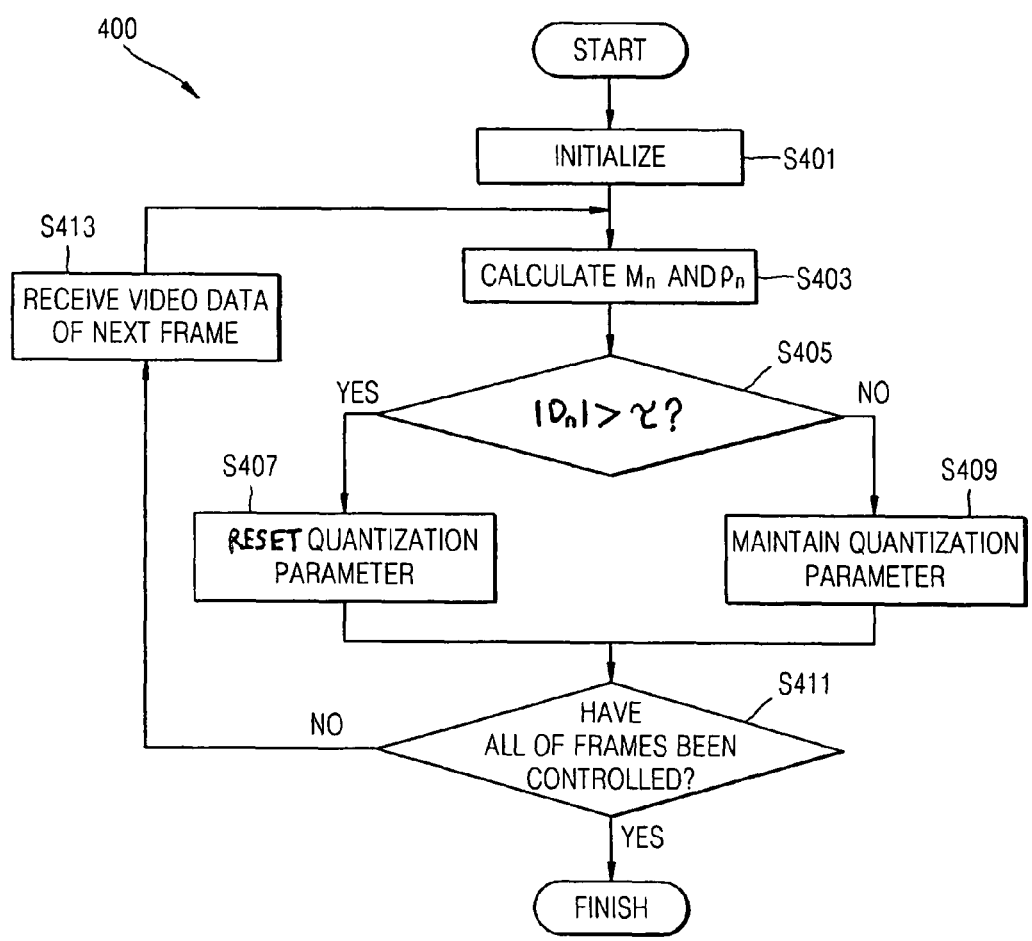
FIG. 4 is a flow chart of a bit rate control method according to an example embodiment.

The bit rate controller 290 will now be explained in detail with reference to FIGS. 3 and 4. FIG. 3 is a block diagram of the bit rate controller 290 according to an example embodiment, and FIG. 4 is a flow chart of a bit rate control method according to an example embodiment.

The bit rate controller 290 may include a quality measure calculator 291, a comparator 293, and/or a quantization parameter setting unit 295. When encoding of an image is started, the bit rate controller 290 may be initialized in operation S401 to encode each frame of the image. After the encoding of each frame is finished, the quality measure calculator 291 may calculate the quality measure $\rho_n$ of each frame and/or a mean $M_n$ of quality measures of two or more previous frames. The number of previous frames N may be greater than or equal to 2. For example, N may be 2, 3, 4, 5, 6, 7, 8, 9, 10, 11, 12, 13, 14, 15, or more. The number of previous frames N may or may not be fixed. For example, it may vary with an index n of the current frame and/or with the type (I-, P-, or B-) of the current frame.

When the index of the current frame is n, the quality measure calculator 291 may calculate the quality measure $\rho_n$ of the current frame after the current frame has been encoded and/or may calculate the mean $M_n$ of the quality measures of the two or more previous frames in operation S403. The mean $M_n$ of the quality measures of the two or more previous frames may be calculated, for example, as follows.

$$M_n = \frac{1}{N}\sum_{l=n-N}^{n-1}\rho_n$$

After calculating the quality measure $\rho_a$ of the current frame and/or the mean $M_n$ of the quality measures of the two or more previous frames, the quality measure calculator 291 may calculate a deviation $D_n$ of the quality measure $\rho_n$ from the mean $M_n$ of quality measures of the two or more previous frames. The deviation $D_n$ may be calculated, for example, as follows.

$$D_n = \rho_n - M_n$$

The comparator 293 may compare the deviation $D_n$ to a critical value measure τ, that may or may not be predetermined, in operation S405 to determine whether the quantization parameter should be reset. It may be determined that a variation in picture quality is large when the deviation $D_n$ is large. On the other hand, it may be determined that the variation in picture quality is small when the deviation $D_n$ is small. Accordingly, the comparator 293 may determine that the quantization parameter should be maintained when the absolute value of the deviation $D_n$ is less than or equal to (or less than) the critical value measure τ in operation S409. The comparator 293 may determine that the quantization parameter should be reset when the absolute value of the deviation $D_n$ is greater than (or greater than or equal to) the critical value measure τ in operation S407. Here, the critical value measure τ may be determined by one or more methods according to characteristic(s) of the image and/or environment in which the image is captured.

The quality measure calculator 291 may judge whether all frames of the image have been input in order to determine whether all the frames have been controlled in operation S411. When all the frames have not been controlled, the next frame may be received in operation S413, may be encoded, and may be subjected to the bit rate control process by going through the aforementioned operations S403 through S411. When all the frames have been controlled, the bit rate control operation may be finished.

Figure 5:
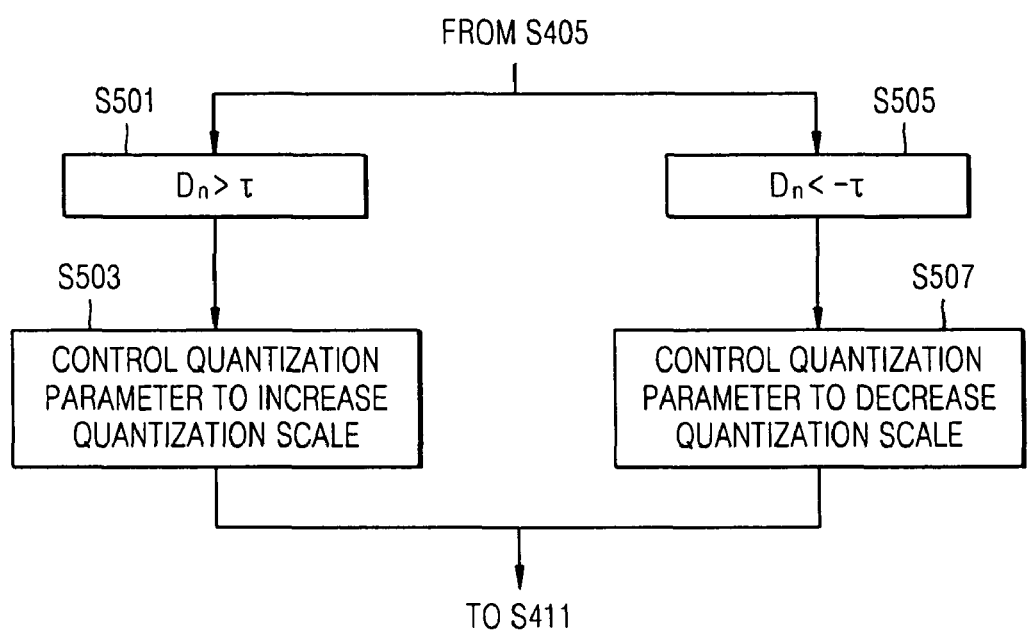
FIG. 5 is a flow chart of resetting a quantization parameter according to an example embodiment.

FIG. 5 is a flow chart of resetting the quantization parameter $K_i$ according to an example embodiment. While the quality measure may be, for example, a picture quality measure and/or a distortion measure in the example embodiments, FIG. 5 illustrates a step of resetting the quantization parameter $K_i$ in the case of picture quality measure.

The quantization parameter setting unit 295 may reset the quantization parameter $K_i$ when the absolute value of the deviation $D_n$ is greater than (or greater than or equal to) the critical value measure τ. The quantization parameter setting unit 295 may reset the quantization parameter differently for two cases: where the deviation $D_n$ is greater than (or greater than or equal to) the critical value measure $\tau$; and/or where the deviation $D_n$ is less than (or less than or equal to) the negative of the critical value measure $\tau$.

When the deviation $D_n$ is greater than (or greater than or equal to) the critical value measure $\tau$ (operation S501), picture quality of the current frame may be better than mean picture quality. Thus, the quantization parameter setting unit 295 may reset the quantization parameter $K_i$ in order to increase the quantization scale Q using, for example, the following equation in operation S503.

$$K_i = K_i + \alpha_i, \text{ where } i = I, P, B$$

That is, the quantization scale may become larger by increasing the quantization parameter $K_i$ by a quantity that may or may not be predetermined. The $\alpha_i$ may be, for example, greater than 0 and/or less than or equal to 1. In an example embodiment, the $\alpha_i$ may be greater than or equal to ⅛ and less than or equal to ¼.

When the deviation $D_n$ is less than (or less than or equal to) the negative of the critical value measure $\tau$ (operation S505), picture quality of the current frame may be worse than mean picture quality. Thus, the quantization parameter setting unit 295 may reset the quantization parameter $K_i$ in order to decrease the quantization scale Q using, for example, the following equation in operation S507.

$$K_i = K_i - \alpha_i, \text{ where } i = I, P, B$$

That is, the quantization scale may become smaller by decreasing the quantization parameter $K_i$ by a quantity that may or may not be predetermined.

The quantization parameter may be reset using a process similar to the above-mentioned process when the quality measure corresponds to the distortion measure. That is, when the deviation $D_n$ is greater than (or greater than or equal to) the critical value measure $\tau$, distortion of the current frame may be more severe than the mean distortion. Thus, the quantization parameter setting unit 295 may reset the quantization parameter $K_i$ in order to decrease the quantization scale Q using, for example, the following equation.

$$K_i = K_i - \alpha_i, \text{ where } i = I, P, B$$

That is, the quantization scale may become smaller by decreasing the quantization parameter $K_i$ by a quantity that may or may not be predetermined.

When the deviation $D_n$ is less than (or less than or equal to) the negative of the critical value measure $\tau$, distortion of the current frame may be less severe than the mean distortion. Thus, the quantization parameter setting unit 295 may reset the quantization parameter $K_i$ in order to increase the quantization scale Q using, for example, the following equation.

$$K_i = K_i + \alpha_i, \text{ where } i = I, P, B$$

That is, the quantization scale may become larger by increasing the quantization parameter $K_i$ by a quantity that may or may not be predetermined.

Those of ordinary skill in the art will understand that the bit rate controller according to example embodiments may be applied to any video encoding apparatus employing a variable bit rate and/or that the bit rate control method according to example embodiments may be applied to any video encoding method employing a variable bit rate. The video encoding method may be, for example, one of MPEG-2, MPEG-4, and H.264.

As described above, the bit rate control method according to example embodiments may prevent picture quality variation that can occur depending on a frame type in variable bit rate video encoding.

While example embodiments have been particularly shown and described, it will be understood by those of ordinary skill in the art that various changes in form and details may be made therein without departing from the spirit and scope of the present invention as defined by the following claims.

What is claimed is:

1. A bit rate control method, comprising:
    calculating a quality measure of a current frame and a mean of quality measures of two or more previous frames in order to calculate a deviation of the quality measure of the current frame from the mean of the quality measures of the two or more previous frames;
    comparing the deviation to a critical value measure; and
    controlling a quantization parameter in response to a result of the comparison, wherein the controlling includes,
        resetting the quantization parameter when an absolute value of the deviation is greater than or equal to the critical value measure, wherein the resetting includes,
            resetting the quantization parameter to increase a quantization scale when the deviation is greater than or equal to the critical value measure, and
            resetting the quantization parameter to decrease the quantization scale when the deviation is less than or equal to a negative of the critical value measure, and
        maintaining the quantization parameter when the absolute value of the deviation is less than the critical value measure.

2. The method of claim 1, wherein the quality measure is a picture quality measure.

3. The method of claim 1, wherein the quality measure is a distortion measure.

4. A variable bit rate video encoding method using the bit rate control method of claim 1.

5. The encoding method of claim 4, wherein video encoding is performed by MPEG-2, MPEG-4, or H.264.

6. A bit rate control method, comprising:
    calculating a quality measure of a current frame and a mean of quality measures of two or more previous frames in order to calculate a deviation of the quality measure of the current frame from the mean of the quality measures of the two or more previous frames;
    comparing the deviation to a critical value measure; and
    controlling a quantization parameter in response to a result of the comparison, wherein the controlling includes,
        resetting the quantization parameter when an absolute value of the deviation is greater than or equal to the critical value measure, wherein the resetting includes,
            resetting the quantization parameter to decrease a quantization scale when the deviation is greater than or equal to the critical value measure, and
            resetting the quantization parameter to increase the quantization scale when the deviation is less than or equal to a negative of the critical value measure, and
        maintaining the quantization parameter when the absolute value of the deviation is less than the critical value measure.

7. The method of claim 6, wherein the quality measure is a picture quality measure.

8. The method of claim 6, wherein the quality measure is a distortion measure.

9. A variable bit rate video encoding method using the bit rate control method of claim 6.

10. The encoding method of claim 9, wherein video encoding is performed by MPEG-2, MPEG-4, or H.264.

11. A bit rate control apparatus, comprising:
a quality measure calculator that calculates a quality measure of a current frame and a mean of quality measures of two or more previous frames in order to calculate a deviation of the quality measure of the current frame from the mean of the quality measures of the two or more previous frames;
a comparator that compares the deviation to a critical value measure; and
a quantization parameter setting unit that controls a quantization parameter in response to a result of the comparison, wherein the quantization parameter setting unit is configured to,
reset the quantization parameter when an absolute value of the deviation is greater than or equal to the critical value measure, wherein the quantization parameter setting unit,
resets the quantization parameter to increase a quantization scale when the deviation is greater than or equal to the critical value measure, and
resets the quantization parameter to decrease the quantization scale when the deviation is less than or equal to a negative of the critical value measure, and
maintain the quantization parameter when the absolute value of the deviation is less than the critical value measure.

12. The apparatus of claim 11, wherein the quality measure is a picture quality measure.

13. The apparatus of claim 11, wherein the quality measure is a distortion measure.

14. A variable bit rate video encoding apparatus using the bit rate control apparatus of claim 11.

15. The encoding apparatus of claim 14, wherein video encoding is performed by MPEG-2, MPEG-4, or H.264.

16. A bit rate control apparatus, comprising:
a quality measure calculator that calculates a quality measure of a current frame and a mean of quality measures of two or more previous frames in order to calculate a deviation of the quality measure of the current frame from the mean of the quality measures of the two or more previous frames;
a comparator that compares the deviation to a critical value measure; and
a quantization parameter setting unit that controls a quantization parameter in response to a result of the comparison, wherein the quantization parameter setting unit is configured to
reset the quantization parameter when an absolute value of the deviation is greater than or equal to the critical value measure, wherein the quantization parameter setting unit,
resets the quantization parameter to decrease a quantization scale when the deviation is greater than or equal to the critical value measure, and
resets the quantization parameter to increase the quantization scale when the deviation is less than or equal to a negative of the critical value measure, and
maintain the quantization parameter when the absolute value of the deviation is less than the critical value measure.

17. The apparatus of claim 16, wherein the quality measure is a picture quality measure.

18. The apparatus of claim 16, wherein the quality measure is a distortion measure.

19. A variable bit rate video encoding apparatus using the bit rate control apparatus of claim 16.

20. The encoding apparatus of claim 19, wherein video encoding is performed by MPEG-2, MPEG-4, or H.264.

* * * * *